(12) United States Patent
Ishikawa et al.

(10) Patent No.: US 9,067,396 B2
(45) Date of Patent: Jun. 30, 2015

(54) METHOD OF PRODUCING COMPOSITE SHEET, METHOD OF PRODUCING ABSORBING ARTICLE USING COMPOSITE SHEET AND APPARATUS THAT PRODUCES COMPOSITE SHEET

(75) Inventors: Shinichi Ishikawa, Kagawa (JP); Taishi Nakamura, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 45 days.

(21) Appl. No.: 13/124,387

(22) PCT Filed: Sep. 10, 2009

(86) PCT No.: PCT/JP2009/065832
§ 371 (c)(1), (2), (4) Date: Jul. 8, 2011

(87) PCT Pub. No.: WO2010/044323
PCT Pub. Date: Apr. 22, 2010

(65) Prior Publication Data
US 2011/0253293 A1    Oct. 20, 2011

(30) Foreign Application Priority Data

Oct. 15, 2008    (JP) .................................. 2008-266716

(51) Int. Cl.
*B32B 37/02* (2006.01)
*B32B 37/14* (2006.01)
*B32B 38/00* (2006.01)

(52) U.S. Cl.
CPC ....... *B32B 37/144* (2013.01); *B32B 2038/0028* (2013.01); *B32B 2307/718* (2013.01); *B32B 2309/105* (2013.01); *B32B 2309/14* (2013.01); *B32B 2555/02* (2013.01)

(58) Field of Classification Search
CPC ..................... B32B 37/144; B32B 2038/0028; B32B 2555/02; B32B 2309/105; B32B 2309/14; B32B 2307/718
USPC .................................. 156/160, 163, 161, 164
See application file for complete search history.

(56) References Cited

U.S. PATENT DOCUMENTS 6,506,329 B1 * 1/2003 Curro et al. ................... 264/283
2002/0004350 A1    1/2002 Morman et al.
(Continued)

FOREIGN PATENT DOCUMENTS

CN    1427863 A    4/2001
CN    1350920 A    8/2001
(Continued)

OTHER PUBLICATIONS

ISR for PCT/JP2009/065832 dated Nov. 24, 2009.
(Continued)

*Primary Examiner* — Jacob T Minskey
*Assistant Examiner* — Vishal I Patel
(74) *Attorney, Agent, or Firm* — Lowe Hauptman & Ham, LLP (57) ABSTRACT

A method of producing a composite sheet includes joining a first sheet in which stretchability in a longitudinal direction of the first sheet is developed by being subjected to a drawing process in the longitudinal direction and a second sheet having stretchability in a longitudinal direction of the second sheet that is lower than the stretchability of the first sheet. The longitudinal directions are aligned with each other. The first sheet is extended in the longitudinal direction, while transporting the first sheet in the longitudinal direction with the first sheet being in contact with an upstream roll and a downstream roll that rotate adjacent to each other. The second sheet is joined to a portion of the first sheet in an overlapped manner, the portion being in contact with the downstream roll in the extended state.

16 Claims, 8 Drawing Sheets

(56) References Cited

U.S. PATENT DOCUMENTS

| | | |
|---|---|---|
| 2002/0023711 A1 | 2/2002 | Tange |
| 2003/0047273 A1 | 3/2003 | Kojo et al. |
| 2006/0003656 A1* | 1/2006 | Morman ................. 442/327 |
| 2006/0148358 A1* | 7/2006 | Hall et al. .............. 442/328 |
| 2006/0148361 A1 | 7/2006 | Ng et al. |
| 2008/0003910 A1 | 1/2008 | Hughes et al. |
| 2008/0105384 A1* | 5/2008 | Eckstein ................. 156/539 |

FOREIGN PATENT DOCUMENTS

| | | | | |
|---|---|---|---|---|
| EP | 1295581 A2 | 8/2002 | | |
| JP | 2002-69815 | 3/2002 | | |
| JP | 2002-069815 | * 3/2002 | .............. | D04H 1/46 |
| JP | 2002-069815 A | 3/2002 | | |
| JP | 2006-069815 | * 3/2002 | .............. | D04H 1/46 |
| JP | 2003-145485 | 5/2003 | | |
| JP | 2003-531937 | 10/2003 | | |
| JP | 2003-531937 A | 10/2003 | | |
| JP | 2007-105453 | 4/2007 | | |
| JP | 2007105453 A | 4/2007 | | |
| JP | 2008-12005 | 1/2008 | | |
| JP | 2008-012005 | * 1/2008 | .............. | A61F 13/15 |
| JP | 2008-012005 A | 1/2008 | | |
| JP | 200812005 A | 1/2008 | | |
| JP | 2008-248460 | 10/2008 | | |
| WO | 03/017904 | 3/2003 | | |

OTHER PUBLICATIONS

Office Action for Chinese Patent Application No. 200980140850.9 dated Mar. 28, 2013.

Supplementary European Search Report mailed May 27, 2013 for corresponding European application No. 09820501.6.

Office Action as issued in corresponding Japanese application.

Office Action dated Dec. 3, 2013, corresponds to Chinese patent application No. 200980140850.9.

Office Action dated Feb. 21, 2014, corresponds to European patent application No. 09820501.6.

* cited by examiner

METHOD OF PRODUCING COMPOSITE SHEET, METHOD OF PRODUCING ABSORBING ARTICLE USING COMPOSITE SHEET AND APPARATUS THAT PRODUCES COMPOSITE SHEET

RELATED APPLICATIONS

The present application is National Phase of PCT/JP2009/065832 filed Sep. 10, 2009, and claims priority from, Japanese Application Number 2008-266716 filed Oct. 15, 2008.

TECHNICAL FIELD

The present invention relates to a method of producing a composite sheet having stretchability, the producing including joining a first sheet in which stretchability in a longitudinal direction of the first sheet is developed by being drawn in the longitudinal direction and a second sheet having stretchability in a longitudinal direction of the second sheet that is lower than the stretchability of the first sheet, the longitudinal directions being aligned with each other, and relates to a method of producing an absorbent article using the composite sheet and an apparatus that produces the composite sheet.

BACKGROUND ART

In the background art, a stretchable sheet may be used as an exterior material of a diaper, which is an example of an absorbent article. For example, a composite sheet in which a first sheet in which high stretchability in a longitudinal direction of the first sheet is developed by being drawn in the longitudinal direction and a second sheet having stretchability in a longitudinal direction of the second sheet that is lower than the stretchability of the first sheet are overlapped and joined may be used as the stretchable sheet.

Figure 1:
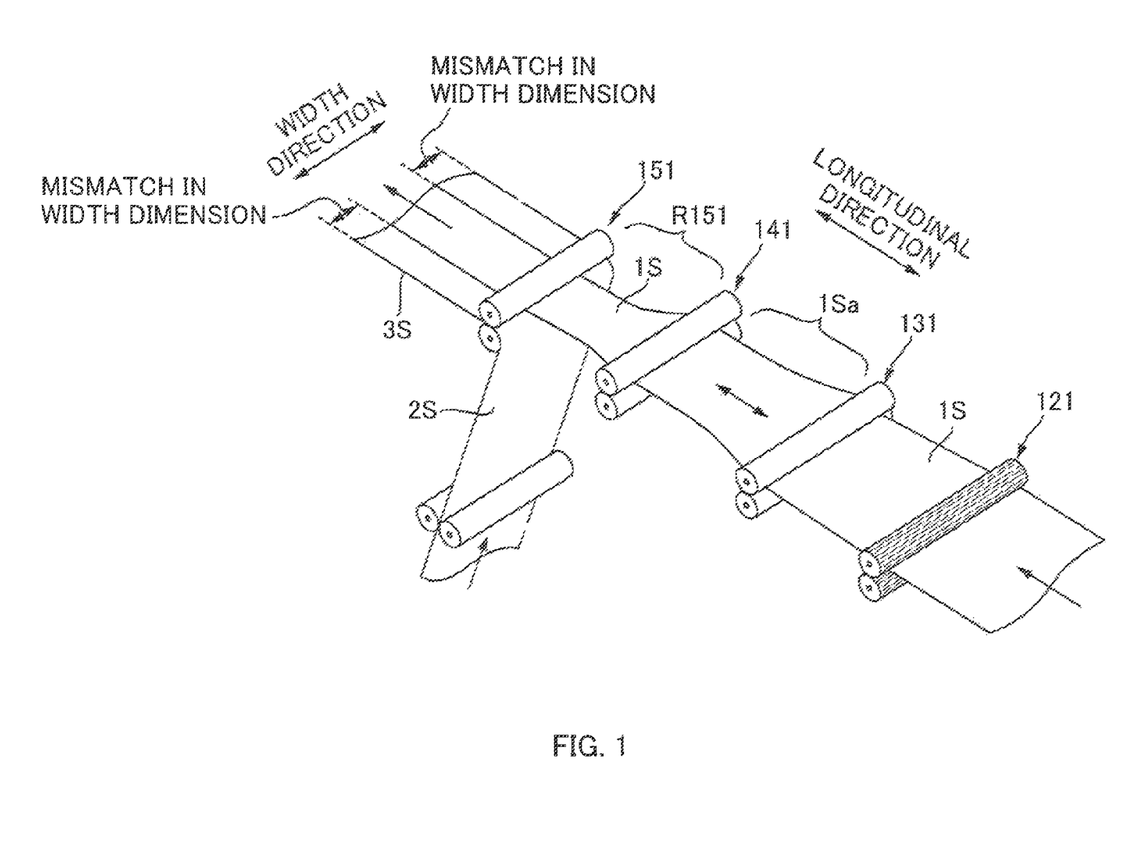
FIG. 1 is an explanatory diagram of a method of producing a composite sheet 3S of a related art.

Here, stretchability of this composite sheet is mainly based on the stretchability of the first sheet. Therefore, the first sheet needs to be attached to the second sheet while being in an extended state, and, for example, a method illustrated in a perspective view of FIG. 1 is disclosed as an exemplary method of producing the composite sheet 3S.

That is to say, according to this method, first, stretchability is developed in the first sheet 1S by applying a so-called gear drawing process on the first sheet 1S with gear rolls 121. Then, secondly, the first sheet 1S is extended in a longitudinal direction while being transported and looped around an upstream roll 131 and a downstream roll 141, and the first sheet 1S in an extended state is transported to a joining roll 151 on a downstream side and joined to the second sheet 2S (e.g., see Patent Literature PTL 1).

CITATION LIST

Patent Literature

[PTL 1] JP-A-2007-105453

SUMMARY OF INVENTION

Technical Problem

However, since the first sheet 1S has high stretchability, a considerable width shrinkage (hereinafter referred to as "necking") may occur due to a tension for transportation in a transport path R151, i.e., the transport path R151 from the downstream roll 141 to the joining roll 151, on which the first sheet 1S is transported while maintaining in an extended state. As a result, it is difficult to join with a width dimension being matched with that of the second sheet 2S.

In addition, non-woven fabric or the like that is used commonly used as a raw material of the first sheet 1S has an irregular basis weight (partial variation of a basis weight (weight per unit area) of a sheet) and a size of the above-mentioned necking may vary depending on such irregular basis weight.

Further, in a case where a length of a portion 1Sa of the first sheet 1S bridged between the upstream rolls 13 and the downstream rolls 141 is long, there will be a considerable necking while extending the first sheet 1S, which makes it even more difficult to match the above-mentioned width dimensions.

With respect to first and second drawbacks among the three drawbacks described above, if the first sheet 1s is joined to the second sheet 2S at the downstream roll 141, the above-mentioned transport path R151 related to the first sheet 1S can be dispensed with and the necking of the first sheet 1S due to the tension for transportation on the transport path R151 can be suppressed, and as a result, it can be considered that the mismatch of the width dimensions between the first sheet 1S and second sheet 2S can be alleviated.

The invention has been contrived in view of the drawbacks of the related art described above, and the object of the invention is to provide a method of producing a composite sheet having stretchability, a method of producing an absorbent article using the composite sheet and an apparatus that produces the composite sheet that can alleviate a mismatch in width dimension of a first sheet and a second sheet in producing a composite sheet having stretchability, the producing including joining a first sheet and a second sheet having stretchability in a longitudinal direction that is lower than the stretchability of the first sheet, the longitudinal directions being aligned with each other.

Solution to Problem

In order to achieve the above-described advantages, a principal aspect of the invention is a method of producing a composite sheet having stretchability, the producing including joining a first sheet in which stretchability in a longitudinal direction of the first sheet is developed by being subjected to a drawing process in the longitudinal direction and a second sheet having stretchability in a longitudinal direction of the second sheet that is lower than the stretchability of the first sheet, the longitudinal directions being aligned with each other, the method including:

extending the first sheet in the longitudinal direction of the first sheet, while transporting the first sheet in the longitudinal direction of the first sheet with the first sheet being in contact with an upstream roll and a downstream roll that rotate adjacent to each other, by providing a difference in peripheral speeds between the upstream roll and the downstream roll; and joining the second sheet to a portion of the first sheet in an overlapped manner, the portion being in contact with the downstream roll in the extended state.

Further, another aspect of the invention is an apparatus that produces a composite sheet having stretchability, the producing including joining a first sheet in which stretchability in a longitudinal direction of the first sheet is developed by being subjected to a drawing process in the longitudinal direction and a second sheet having stretchability in a longitudinal direction of the second sheet that is lower than the stretchability of the first sheet, the longitudinal directions being aligned with each other, the apparatus including:

an upstream roll and a downstream roll that rotate adjacent to each other;

extending the first sheet in the longitudinal direction of the first sheet, while transporting the first sheet in the longitudinal direction of the first sheet with the first sheet being in contact with the upstream roll and the downstream roll, by providing a difference in peripheral speeds between the upstream roll and the downstream roll; and the downstream, roll that joins the second sheet to a portion of the first sheet in an overlapped manner, the portion being in contact with the downstream roll in the extended state.

Features of the invention other than the above will become clear by the description of the present specification and the accompanying drawings.

Advantageous Effects of Invention

According to the present invention, a mismatch in width dimension of a first sheet and a second sheet can be alleviated.

MODE FOR CARRYING OUT THE INVENTION

At least the following matters will be made clear by the description of the present specification with reference to the accompanying drawings.

According to an aspect of the present invention, a method of producing a composite sheet having stretchability, the producing including joining a first sheet in which stretchability in a longitudinal direction of the first sheet is developed by being subjected to a drawing process in the longitudinal direction and a second sheet having stretchability in a longitudinal direction of the second sheet that is lower than the stretchability of the first sheet, the longitudinal directions being aligned with each other, the method including:

extending the first sheet in the longitudinal direction of the first sheet, while transporting the first sheet in the longitudinal direction of the first sheet with the first sheet being in contact with an upstream roll and a downstream roll that rotate adjacent to each other, by providing a difference in peripheral speeds between the upstream roll and the downstream roll; and joining the second sheet to a portion of the first sheet in an overlapped manner, the portion being in contact with the downstream roll in the extended state.

With such method for producing a composite sheet, the downstream roll extends the first sheet between the downstream roll and the upstream roll to provide stretchability in the composite sheet, and further, at the downstream roll, the second sheet is joined to the first sheet. That is to say, the downstream roll serves as a roll that extends the first sheet and also as a joining roll that joins the second sheet.

Therefore, there is no need to transport the first sheet having a high stretchability and in the extended state in a bridged manner to a position of the separately provided joining roll and thus a possible necking in the first sheet due to a tension during transporting can be suppressed, and as a result, a mismatch in width dimension between the first sheet and the second sheet can be alleviated.

It is preferable that in such a method of producing a composite sheet, the first sheet is looped around the upstream roll and the downstream roll in an S-shaped manner.

With such method of producing a composite sheet, the first sheet is looped around the upstream roll and the downstream roll in an S-shaped manner. Accordingly, by appropriately adjusting the arrangement of the upstream roll and the downstream roll, a length of a portion of the first sheet that is bridged between the upstream roll and the downstream roll can be decreased. For example, the length of the portion can be made shorter than a sum of a radius of the upstream roll and a radius of the downstream roll. As a result, the length of one bridge portion, i.e., an interval between positions of action of tension load applied during the extending, and thus the necking during the extending can be reduced.

It is to be noted that the reducing of the necking of the first sheet by decreasing one interval between the points of action of the tension load is based on a knowledge that, in a tensile test, when a sample of the first sheet is grasped at both end sections and pulled, the necking becomes greater as the interval between the grasping position becomes greater, even if other conditions are the same. This will be described later.

It is preferable that in such a method of producing a composite sheet, the upstream roll and the downstream roll are arranged in such a manner that a length of a portion of the first sheet bridged between the upstream roll and the downstream roll is shorter than a sum of a radius of the upstream roll and a radius of the downstream roll.

With such method of producing a composite sheet, a length of a portion of the first sheet that is bridged between the upstream roll and the downstream roll can be further decreased and thus necking during the extending can be even more reduced.

It is preferable that in such a method of producing a composite sheet, a peripheral speed of the downstream roll is set at a multiple of greater than or equal to 1.6 of a peripheral speed of the upstream roll.

With such method of producing a composite sheet, the first sheet can be positively extended.

It is preferable that in such a method of producing a composite sheet, the first sheet is wound around the downstream roll at a predetermined winding angle; and a phase angle between a winding start position of the first sheet on the downstream roll and a joining position where the second sheet is joined to the first sheet is greater than or equal to 90°.

With such method of producing a composite sheet, since a contacting region between the peripheral surface of the downstream roll and the first sheet becomes larger and a contraction deformation in the width direction of the first sheet by a friction force due to the contact will be positively restricted, necking is less likely to occur. As a result, a mismatch in width dimension of the first sheet and the second sheet can be reduced.

It is preferable that in method of producing a composite sheet,
a first roll is provided in a rotatable manner and opposing the upstream roll;
the first roll presses the first sheet against the upstream roll, the first sheet being in contact with the upstream roll;
a second roll is provided in a rotatable manner and opposing the downstream roll; and
the second roll presses the second sheet against the first sheet, the first sheet being in contact with the downstream roll.

With such method of producing a composite sheet, since the first sheet is pinched between the upstream roll and the first roll, the first sheet can be held in close contact with the upstream roll. Also, since the first sheet and the second sheet are pinched between the downstream roll and the second roll, the first sheet can be held in close contact with the downstream roll. Therefore, skidding of the upstream roll and the downstream roll against the first sheet can be suppressed, and the first sheet can be extended due to a difference in peripheral speeds between the upstream roll and the downstream roll.

It is preferable that in such method of producing a composite sheet,
the joining of the first sheet and the second sheet is performed with an adhesive agent applied to the first sheet and the second sheet before the joining,
the applying of the adhesive agent being intermittently performed in a longitudinal direction of the first sheet and the second sheet.

With such method of producing a composite sheet, since the adhesive agent is intermittently applied on the first sheet and the second sheet in the longitudinal direction, these first sheet and the second sheet are joined in the longitudinal direction in an intermittent manner. Therefore, when the first sheet is extended and thereafter the extension is released and contracted, since it can become slack at a non-joining portion (a portion other than the joining section) of the second sheet, it is possible to prevent the low stretchability of the second sheet from inhibiting the contraction of the first sheet, along an entire length of the first sheet, and as a result, the produced composite sheet becomes flexibly stretchable based on the stretchability of the first sheet.

It is preferable that in a method of producing a composite sheet,
on an upstream side of the upstream roll, by passing the first sheet that has not been subject to a drawing process through a gap between gear rolls in a pair, the gear rolls rotating with a plurality of teeth formed on each peripheral surface mating with each other, the first sheet is drawn in a peripheral direction of the gear roll by the teeth to develop stretchability in the first sheet; and
the first sheet in which the stretchability is developed being supplied to the upstream roll.

With such method of producing a composite sheet, since a so-called gear drawing process is used in developing the stretchability of the first sheet, the stretchability of the first sheet can be positively developed.

It is preferable that in such a method of producing a composite sheet, the process of extending the first sheet with the upstream roll and the downstream roll is one of a drawing process that develops the stretchability in the first sheet and a drawing process that increases the stretchability.

With such method of producing a composite sheet, since the drawing process is performed with the upstream roll and the downstream roll, a drawing process to be performed in a preceding step can be dispensed with or reduced.

It is preferable that in a method of producing an absorbent article using a such composite sheet, in an absorbent body that absorbs liquid is joined to a skin-contacting side of the composite sheet.

With such method of producing an absorbent article, an effect similar to those of the above-mentioned composite sheet can be achieved in the method of producing an absorbent article.

Further, according to another aspect of the present invention, an apparatus that produces a composite sheet having stretchability, the producing including joining a first sheet in which stretchability in a longitudinal direction of the first sheet is developed by being subjected to a drawing process in the longitudinal direction and a second sheet having stretchability in a longitudinal direction of the second sheet that is lower than the stretchability of the first sheet, the longitudinal directions being aligned with each other, the apparatus including:
an upstream roll and a downstream roll that rotate adjacent to each other;
extending the first sheet in the longitudinal direction of the first sheet, while transporting the first sheet in the longitudinal direction of the first sheet with the first sheet being in contact with the upstream roll and the downstream roll, by providing a difference in peripheral speeds between the upstream roll and the downstream roll; and
the downstream roll that joins the second sheet to a portion of the first sheet in an overlapped manner, the portion being in contact with the downstream roll in the extended state.

With such apparatus that produces a composite sheet, the downstream roll extends the first sheet between the downstream roll and the upstream roll to provide stretchability in the composite sheet, and further, at this downstream roll, the second sheet is joined to the first sheet. That is to say, the downstream roll serves as a roll that extends the first sheet and also as a joining roll that joins the second sheet.

Therefore, there is no need to transport the first sheet having a high stretchability and in the extended state in a bridged manner to a position of the separately provided joining roll and thus a possible necking in the first sheet due to a tension during transporting can be suppressed, and as a result, a mismatch in width dimensions between the first sheet and the second sheet can be alleviated.

Method of Producing Composite Sheet 3S of the Present Embodiment

Before describing a method of producing a composite sheet 3S of the present embodiment, description will be made for a first sheet 1S and a second sheet 2S that are materials of the composite sheet 3S.

The first sheet 1S is a sheet in which stretchability is developed in a longitudinal direction by being subjected to drawing in the longitudinal direction and the second sheet 2S is a sheet that has stretchability less than that of the first sheet in which the stretchability is developed.

Here, "stretchability is high" is to mean that a stretch deformation occurs with a low modulus of elasticity and, for example, means that a small tension load is required to extend a sheet until its total length becomes a several multiple thereof. Therefore, concerning a magnitude relationship of stretchability between the first sheet 1S and the second sheet 2S described above, it can also be said that "the first sheet 1S undergoes stretch deformation with a modulus of elasticity lower than that of the second sheet 2S", or, "a tension load at a time the total length is extended to a predetermined multiple thereof is smaller for the first sheet 1S than for the second, sheet 2S". The phrase "stretchability is developed" means to become capable of undergoing stretch deformation at a low modulus of elasticity, or briefly stated, means that it will be easily extended with a small tension load.

Further, describing it in more practical words, it can be said that the first sheet 1S having high stretchability does not break due to plastic deformation even when extended to a predetermined multiple, whereas, the second sheet 2S having a low stretchability breaks due to plastic deformation when extended to a predetermined multiple.

Hereinafter, each of the sheets 1S and 2S will be described.

<<<First Sheet 1S>>>

As has been described above, the first sheet 1S is a sheet in which stretchability is developed by a gear drawing process and, for example, a nonwoven fabric of a commingled type that is produced by blending an extensible fiber and a stretchable fiber by melt spinning or the like may be used as its material. Here, the stretchable fiber is a fiber that can extend elastically and the extensible fiber is a fiber that can extend in a substantially non-elastic manner. In other words, the extensible fiber may be defined as a fiber that undergoes plastic deformation with an elongation smaller than the elongation at an elastic limit of the stretchable fiber.

An exemplary extensible fiber is a thermoplastic polyolefin fiber, and an exemplary stretchable fiber is a thermoplastic elastomeric fiber. Examples of the thermoplastic polyolefin fiber include single fibers, such as a polypropylene fiber and a polyester fiber, and a conjugate fiber with a sheath core structure including polypropylene or polyester, and examples of the thermoplastic elastomeric fiber include a polyurethane fiber and a styrene fiber.

The methods of producing the nonwoven fabric include, for example, a spunbonding method or a thermal bonding method. Basis weight and fiber diameter of the nonwoven fabric are suitably selected from, for example, ranges of 20 to 50 (g/m$^2$) and 10 to 30 (μm), respectively. Furthermore, the mixing ratio of the extensible fiber and the stretchable fiber is suitably selected from a range of 20 to 80%.

Then, by applying the drawing process to such nonwoven fabric, stretchability is developed in the nonwoven fabric, and in other words, the first sheet 1S is provided with stretchability.

Figure 2A:
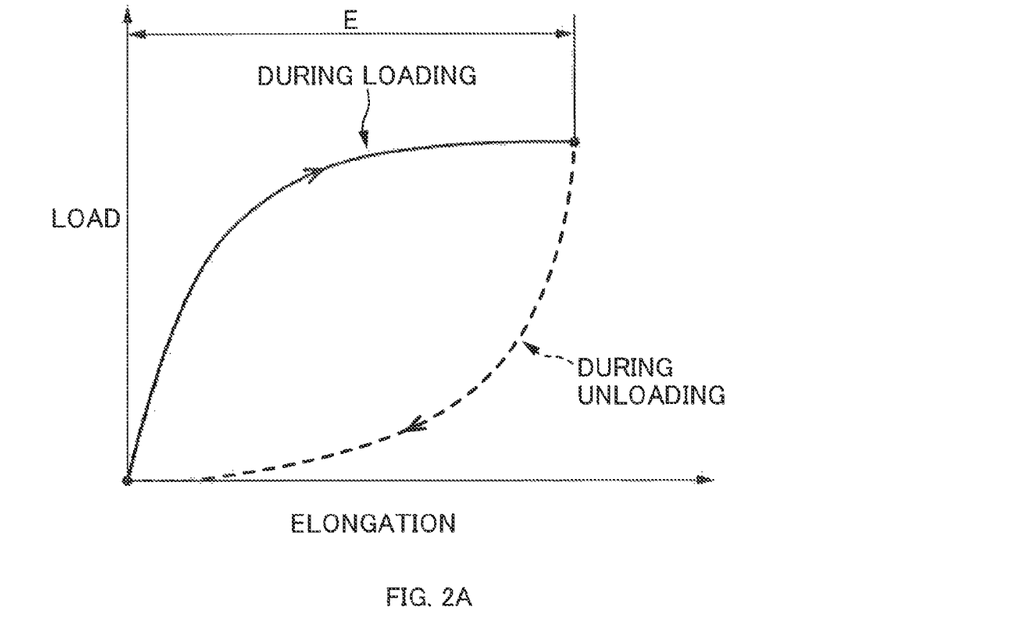
FIGS. 2A and 2B are explanatory diagrams showing a mechanism in which stretchability is developed in a non-woven fabric 3 due to a drawing process, and showing load-elongation curves for the nonwoven fabric 3.
Figure 2B:
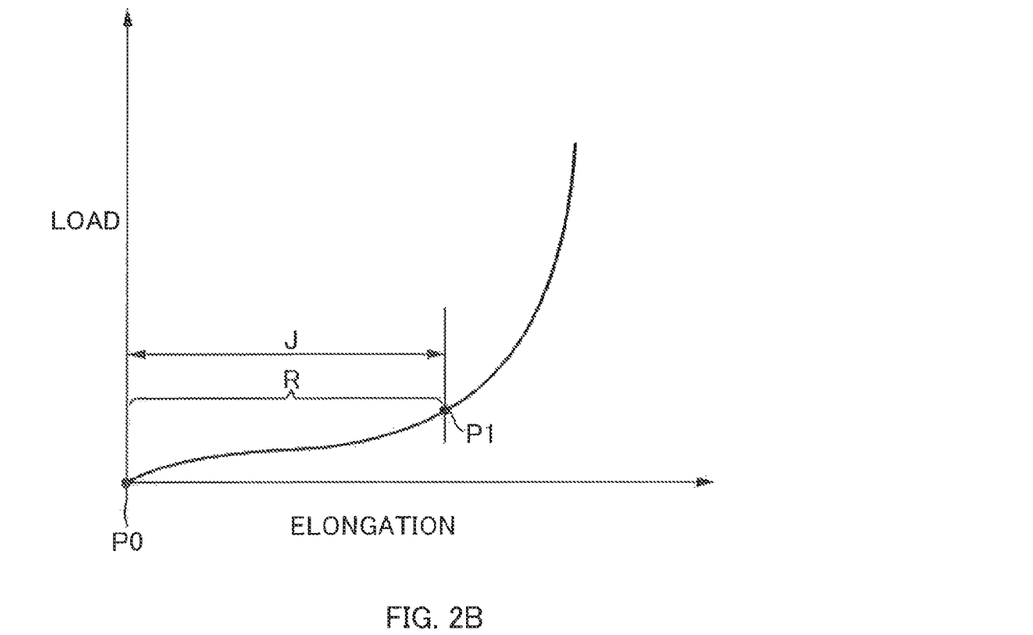

FIGS. 2A and 2B are explanatory diagrams of a mechanism in which stretchability is developed by the drawing process and each diagram shows a load-elongation curve of the nonwoven fabric.

When a tension (hereinafter also referred to as a load) is applied to the nonwoven fabric within the elastic limit of the stretchable fiber in order to perform the drawing process on an undrawn nonwoven fabric, the load-elongation curve shown in FIG. 2A is obtained during such drawing process. That is to say, the obtained load-elongation curve includes a hysteresis in which a load under the same elongation is lower when the tension is being unloaded than when the tension is being loaded.

And, in a case where tension is applied again after the drawing process, the load-elongation curve shown in FIG. 2B will be plotted. In detail, it stretches at a very low modulus of elasticity from the origin P0 to an inflection point P1 in FIG. 2B. However, once it exceeds the inflection point P1, the load rapidly increases in a substantially quadric curve form. And normally, with an appearance of this low elastic modulus range R, the stretchability is deemed to have been developed in the nonwoven fabric 3 by the drawing process. An elongation amount J from the origin P0 in an unloaded state to the inflection point P1 is defined as a "developed stretch amount J".

Incidentally, the reason why the nonwoven fabric stretches at a significantly low modulus of elasticity from the origin P0 to the inflection point P1 after the drawing process can be explained as below.

Figure 3A:
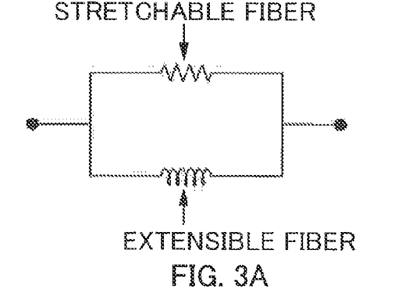
FIG. 3A is a schematic view showing a state of fiber before the drawing process (i.e., not yet drawn).
Figure 3B:
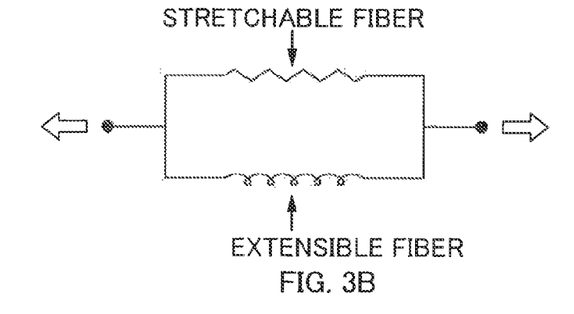
FIG. 3B is a schematic view showing a state of fiber during the drawing process (i.e., during loading).
Figure 3C:
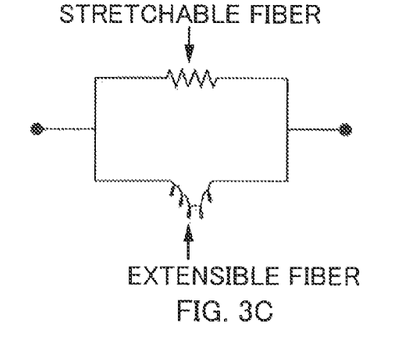
FIG. 3C is a schematic view showing a state of fiber after the drawing process (i.e., unloaded).

FIG. 3A is a schematic view showing a state of fiber before the drawing process (i.e., an undrawn state). FIG. 3B is a schematic view showing a state of fiber during the drawing process (i.e., during loading). FIG. 3C is a schematic view showing a state of fiber after the drawing process (i.e., after being unloaded). Note that, generally, a minimum unit structure constituting the nonwoven fabric can be modeled as a parallel connection of the stretchable fiber and the extensible fiber, as shown in FIG. 3A.

In the case where the undrawn nonwoven fabric shown in FIG. 3A is drawn, as canteen seen in FIG. 3B, the stretchable fiber undergoes elastic deformation, where as the extensible fiber whose elongation at the elastic limit is smaller than that of the stretchable fiber, undergoes plastic deformation at a comparatively early stage and is elongated by plastic deformation. Accordingly, when the tension is released from this state, as shown in FIG. 3C, the stretchable fiber will simply be free of elastic elongation; in other words, a total length thereof returns to substantially the same as the length prior to application of the tension. However, the extensible fiber will have a total length that has been elongated by an amount of the plastic elongation and the extensible fiber becomes slack.

Figure 3D:
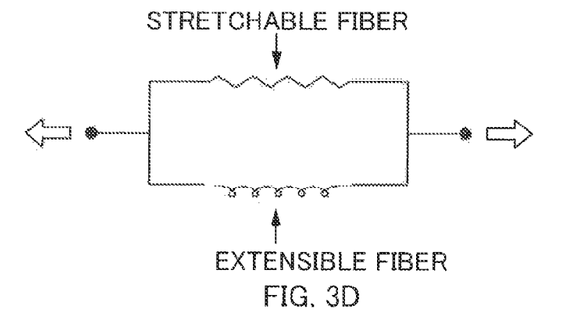
FIG. 3D is at schematic view showing a state of fiber when the nonwoven fabric 3 after the drawing process is drawn again.

And, when the tension is applied again to the nonwoven fabric that has undergone the drawing process, the nonwoven fabric resists the above-described tension only by the elastic deformation of the stretchable fiber until the slack portion of the extensible fiber is fully extended and the entire length thereof is tensed. Therefore, as shown in FIG. 2B, the nonwoven fabric is extended with a significantly low modulus of elasticity. However, as shown in FIG. 3D, from the point at which there is no more above-mentioned slack in the extensible fiber and the extensible fiber is stretched over the entire length thereof, the elastic-plastic deformation of the extensible fiber also starts to resist the tension. Accordingly, the tension required to extend the nonwoven fabric rapidly increases from this point. That is, the point at which the slack in the extensible fiber disappears is the inflection point P1 in FIG. 2B, and based on the descriptions given so far, as shown in FIG. 2B, the load-elongation curve after the drawing process indicates that the nonwoven fabric is stretched at an extremely low elastic modulus until the inflection point P1, and the load rapidly increases after exceeding the inflection point P1. Incidentally, it goes without saying that when the tension is released within the range R from the origin P0 to the inflection point P1, namely, within the range R of the "developed stretch amount J", the load-elongation curve substantially tracks back along the load-elongation curve for loading shown in FIG. 2B, and returns to the origin P0.

Hereinafter, a parameter "drawing multiple M" is introduced as a parameter having the same definition to a drawing amount E during the above-mentioned drawing. A definition equation of the drawing multiple M is given as Equation 1 indicated below using a total length Lb in a drawing direction during drawing and a total length La in the drawing direction before drawing:

$$M = Lb/La \qquad \text{(Eq. 1)}$$

Herein, the above-mentioned term "drawing (process)" is differentiated from the term "extending". In other words, "extending" is used in a case of simply extending the sheet, and in a case where the above-mentioned stretchability is developed or stretchability increases in the sheet due to the extension, the extension is expressed as "drawing". That is, "drawing" is one mode of "extending". It is to be noted that an increase in stretchability indicates an increase in the above-mentioned stretch mount J (FIG. 2B).

<<<Second Sheet 2S>>>

The second sheet 2S is a sheet that has a stretchability lower than that of the first sheet 1S and, here, a sheet that has almost no stretchability is used. The sheet that has almost no stretchability is a sheet that may break due to plastic deformation when, for example, extended to 1.2 times.

It is to be noted that there is no particular constraints with respect to the material to the second sheet 2S except for a condition that its stretchability is lower than that of the first sheet 1S, and a nonwoven fabric produced by a spunbonding method or a point-bonding method using a polypropylene fiber or a PET fiber and having a basis weight in a range of 10 to 50 (g/m$^2$) is used, but may be any material other than this and may also be a woven fabric or a film.

<<<Method of Producing Composite Sheet 3S>>>

Figure 4:
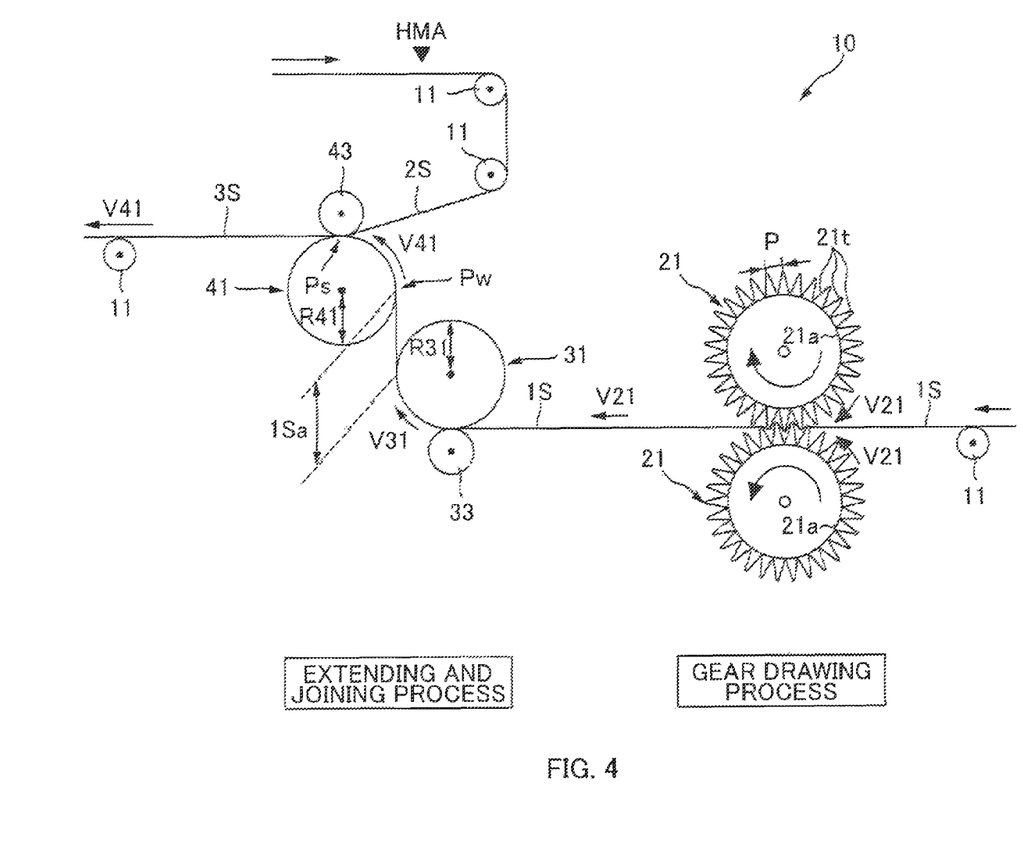
FIG. 4 is a schematic diagram of a method of producing a composite sheet 3S of the present embodiment.

FIG. 4 is an explanatory diagram of a method of producing a composite sheet 3S and a producing apparatus 10 related to the producing method is illustrated in a side view. A process related to this producing method is performed while transporting the first sheet 1S and the second sheet 2S along a predetermined transport path in belt-like sheets continuing in a longitudinal direction and that includes, as process steps thereof, (1) a gear drawing step in which stretchability is developed in the first sheet 1S by applying the gear drawing process on the first sheet 1S; and (2) an extending and joining step in which the first sheet 1S in which stretchability is developed is extended and the second sheet 2S is joined to the first sheet 1S that is in the extended state.

In the description below, unless otherwise stated, the above-mentioned transport path and a width direction of each sheet 1S, 2S are perpendicular to each other, and, each roll 11, 21, 31, 41, 33 or 43 such as a transport roll 11 is arranged in such a manner that an orientation of its rotational axis is aligned in a direction parallel to the above-mentioned width direction.

(1) Gear Drawing Step

In the gear drawing step, as described above, a so-called gear drawing process is applied to, for example, the first sheet 1S that is in an undrawn state. Therefore, in this step, as shown in FIG. 4, upper and lower gear rolls 21, 21 are provided in a pair. On a peripheral surface 21a, 21a of each of the gear rolls 21, 21, teeth 21t (teeth having a tooth shape that is the same as those of a so-called "spur gear") are formed in a corrugated manner at a predetermined formation pitch P along a peripheral direction. Therefore, while these gear rolls 21, 21 are driven and are rotating at a predetermined peripheral speed V21 (speed at the teeth tip), the undrawn first sheet 1S is passed through a gap between the gear rolls 21, 21. The first sheet 1S is deformed by being bent at three points by the teeth 21t of the upper gear rolls 21 and the teeth 21t of the lower gear rolls 21 that mate with each another, and is drawn in the peripheral direction of the gear rolls 21. After being drawn in this manner, stretchability is developed in the first sheet 1S. The first sheet 1S in which stretchability is developed is transferred to the subsequent joining step at a substantially the same speed as the peripheral speed V21.

It is to be noted that the drawing multiple Mg of the gear drawing is, for example, adjusted to any value in a range of, for example, 1.6 to 3.0 and the adjustment of the drawing multiple Mg is carried out by altering a mating depth of the teeth 21t, 21t of the upper and lower gear rolls 21, 21.

(2) Extending and Joining Step

In the extending and joining step, the first sheet 1S sent from the gear drawing step is extended and the second sheet 2S is joined to the first sheet 1S in an extended state. It is to be noted that, the reason for joining the second sheet 2S to the first sheet 1S in the extended state is to provide stretchability to the composite sheet 3S based on the high stretchability of the first sheet 1S.

As shown in FIG. 4, in the extending and joining step, an upstream roll 31 and a downstream roll 41 are arranged adjacent to each other upstream and downstream on the transport path. The first sheet 1S sent from the gear drawing step comes into contact with smooth peripheral surfaces of the rolls 31, 41 in an order of the upstream roll 31 and the downstream roll 41, and is transported at a substantially the same speed as the peripheral speed V31, V41 of each roll 31, 41 by driving and rotating the rolls 31, 41 without substantially skidding against the peripheral surface of the rolls 31, 41.

Here, the peripheral speed V31 of the upstream roll 31 is set at substantially the same speed as the peripheral speed V21 of the gear roll 21, whereas, the peripheral speed 41 of the downstream roll 41 is set at a value greater than the peripheral speed V31 of the upstream roll 31. Accordingly, the first sheet 1S is extended with these rolls 31 and 41. The extending multiple Ms (=total length in the direction of extension during extension/total length in the direction of extension before extension) due to a difference in peripheral speed of the rolls 31 and 41 is, for example, set within a range of the drawing multiple Mg in the above-mentioned gear drawing step (i.e., less than or equal to the drawing multiple Mg).

It is to be noted that the extending multiple Ms may be greater than the above-mentioned drawing multiple Mg, and in such a case, the first sheet 1S will undergo the drawing process also with these rolls 31, 41. That is to say, as a result of a further increase in the above-mentioned amount of stretch J of the first sheet 1S (see FIG. 2B), the stretchability of the first sheet 1S increases.

It is to be noted that, on the other hand, the second sheet 2S is supplied to the downstream roll 41 in a continued state in its longitudinal direction and at substantially the same speed as the above-mentioned, peripheral speed V41. Then, at a position Ps at which the first sheet 1S is in contact substantially without relative skidding on the peripheral surface of the downstream roll 41, the second sheet 2S is superposed and joined to the first sheet 1S. Thus, the composite sheet 3S is produced and transferred to a subsequent step, not shown, at a substantially the same speed as the above-mentioned peripheral speed V41.

That is to say, the downstream roll 41 serves as an extending roll that extends the first sheet 1S, as well as, a joining roll that joins the first sheet 1S to the second sheet 2S. Therefore, with this configuration, there is no need to transport the first sheet 1S in the extended state in a bridging manner to a position of the separately provided joining roll and thus a possible necking in the first sheet 1S due to the tension during the transporting in a bridging manner can be suppressed. As a result, a mismatch in the width dimension with the second sheet 2S can be reduced.

In the joining described above, for example, an appropriate adhesive agent such as a hot-melt adhesive agent can be used. That is to say, on the second sheet 2S, a hot-melt adhesive agent HMA is applied continuously or intermittently on an entire surface in advance at a position upstream of the downstream rolls 41. It is to be noted that the adhesive may be applied on the first sheet 1S instead of the second sheet 2S. Further, the joining method is not limited to adhesion and welding such as Heat seal and sonic seal may also be used.

In the example shown in FIG. 4, a so-called S-shaped looping is adopted as a method of looping the first sheet 1S around the upstream roll 31 and the downstream roll 41. In detail, the upstream roll 31 and the downstream roll 41 are made to come into contact with opposite faces to each other regarding the front side and back side of the first sheet 1S, and directions of rotation of the rolls 31, 41 are opposite to each other. Thus, the first sheet 1S is looped around on the upstream roll 31 and the downstream roll 41 in an S-shaped manner.

Figure 5:
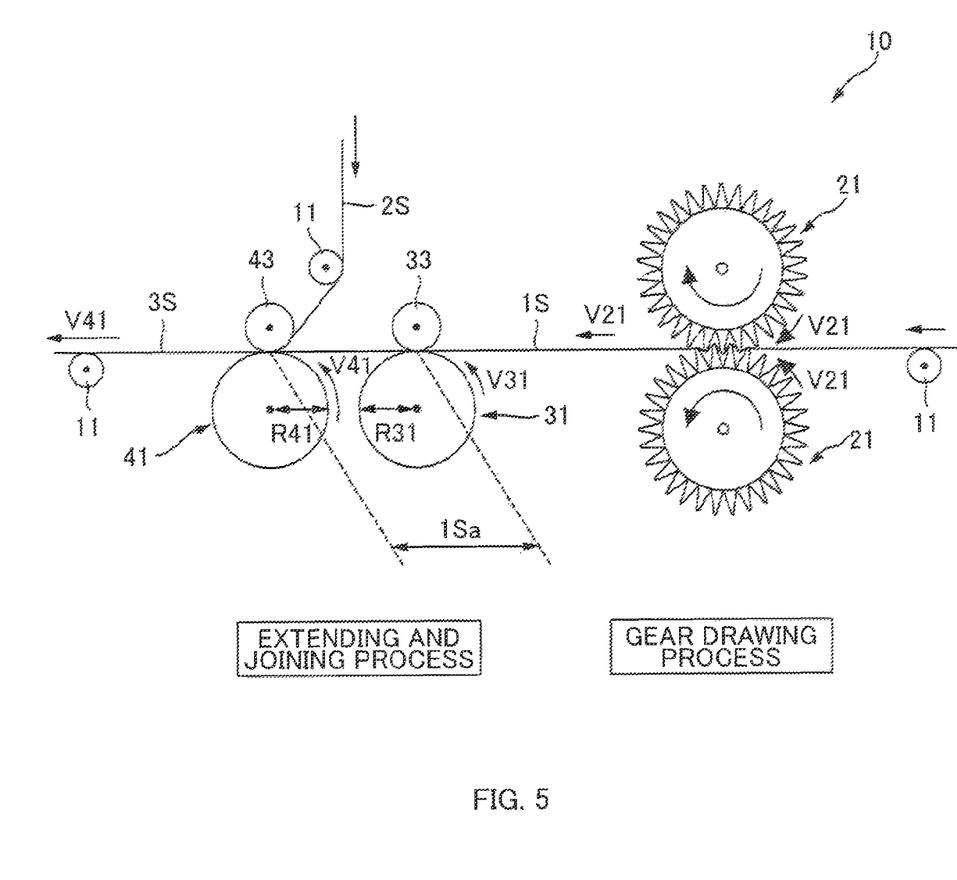
FIG. 5 is a schematic diagram of a comparison example with respect to the S-shaped configuration of FIG. 4.

With such an S-shaped configuration, as compared to a case of an arrangement shown in FIG. 5, a length of a portion 1Sa of the first sheet 1S bridging between the upstream rolls 31 and the downstream rolls 41 can be made shorter, and as a result, necking during the extending can be more effectively suppressed. Details are as follows.

Figure 6A:
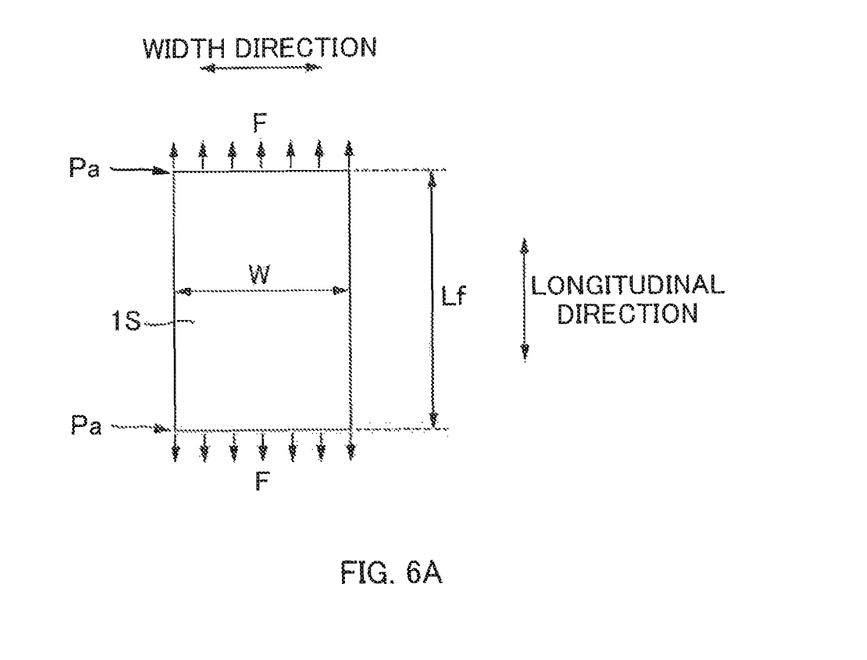
FIG. 6A is an explanatory diagram, of an interval Lf between positions of action Pa and Pa of a tension load F that has an influence on necking

The first sheet 1S may result in a necking due to its tension during extension and an amount of the necking (an amount of contraction of a width of the first sheet 1S) is dependent on an interval Lf between a pair of positions of action Pa and Pa of a tension load F for applying a tension to the first sheet 1S (see FIG. 6A). That is to say, the necking becomes greater with an increase of the interval Lf and the necking becomes smaller with a decrease in the interval Lf.

Figure 6B:
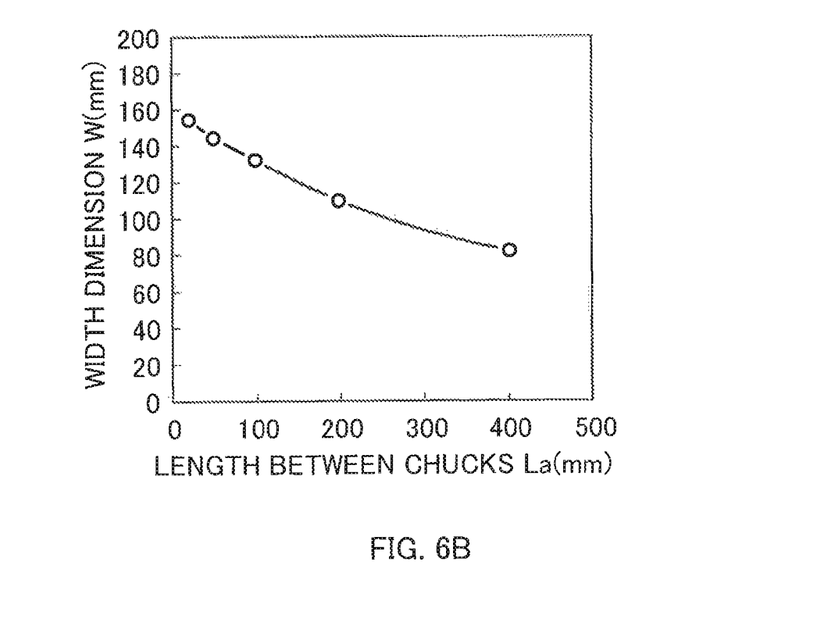
FIG. 6B is a graph indicating that necking changes with respect to the interval Lf.

FIG. 6B is a graph for explaining such a tendency. This graph indicates a change in a width dimension W of a sample of the first sheet 1S when both end sections in the longitudinal direction of the sample of the sheet 1S is grasped with grasping sections of a tensile test machine and pulled with a tension load F of 3.5 N and with a predetermined elongation ratio (the same definition as the above-mentioned extending multiple, which is approximately 2.5 here.)

A length between chucks indicated along the horizontal axis in FIG. 6B refers to an interval between the grasping sections of the tension testing machine and, in other words, it has the same definition as the positions of action Pa and Pa of the above-mentioned tension load F. The vertical axis indicates a width dimension of the sample under the tension load F. It is to be noted that the width dimension W of the sample without load is 160 mm and this width dimension W becomes smaller as the necking becomes greater.

Accordingly, it can be seen from this graph that, even if other conditions (width dimension of the sample, magnitude of the tension load and elongation ratio) are the same, the amount of contraction of the width of the sample under the tension load F becomes greater with an increase in the interval Lf between the positions of action Pa and Pa of the tension load F.

In other words, this graph indicates that, even if conditions such as the magnitude of the tension during extension and the extension multiple Ms are the same, the necking during extension becomes greater with an increase in the interval Lf between the positions of action Pa and Pa of the tension load F exerted on the first sheet 1S from the upstream roll 31 and the downstream roll 41, i.e., a length of a portion 1Sa of the first sheet 1S bridged between the upstream roll 31 and the downstream roll 41.

Regarding this point, in a case of the exemplary configuration of FIG. 5 which is not an S-shaped looped configuration, a length of a portion 1Sa of the first sheet 1S that is bridged between the upstream roll 31 and the downstream roll 41 cannot be physically made shorter than a sum of a radius R31 of the upstream roll 31 and a radius R41 of the downstream roll 41 and there is some drawback in suppression of necking. Whereas, in the case of the S-shaped configuration of FIG. 4, the length of the portion 1Sa of the first sheet 1S that is bridged between the upstream roll 31 and the downstream roll 41 can be made shorter than the sum of the radius R31 of the upstream roll 31 and the radius R41 of the downstream roll 41. Therefore, by adjusting the arrangement of the upstream roll 31 and the downstream roll 41, when the length of the bridged portion 1Sa of the first sheet 1S is made shorter than the sum of the radius R31 and the radius R41 as shown in FIG. 4, the necking during extension can be effectively reduced.

It is to be noted that the length of the portion 1Sa of the first sheet 1S that is bridged between the upstream roll 31 and the downstream roll 41 can be expressed as "a distance between a downstream end of a portion where the first sheet 1S and the upstream roll 31 is in contact and a an upstream end of a portion where the first sheet 1S and the downstream roll 41 is in contact" and may also be expressed as "a length of a portion of the first sheet 1S situated between the upstream roll 31 and the downstream roll 41 that is a portion 1Sa neither in contact with the upstream roll 31 nor with the downstream, roll 41".

It is to be noted that the reason why a size of the necking represents dependency of a size of the interval Lf between the positions of action Pa and Pa of the tension load F is that an effect of a force that restricts a contraction deformation in the width direction of the first sheet 1S occurring at the position of action Pa of the above-mentioned tensile load F becomes smaller as it becomes farther apart from the above-mentioned point of action Pa.

In the description above, with respect to the S-shaped configuration of FIG. 4, although description was not made for a lower limit value of the length of the portion 1Sa of the sheet 1S bridging between the upstream roll 31 and the downstream roll 41, it goes without saying that the first sheet 1S can pass through the gap between the upstream roll 31 and the downstream roll 41 and thus the size of the gap is set within a range of a multiple of 1.0 to 300 of a thickness of the first sheet 1S.

Now, as shown in FIG. 4, it is preferable that a first roll 33 is provided in a manner opposing a peripheral surface of the upstream roll 31 and the first sheet 1S is pressed against the peripheral surface of the upstream roll 31 with the first roll 33. Then, the point of action Pa of the tensile load F on the upstream roll 31 side can be positively ensured. Also, it is preferable that, as shown in FIG. 4, a second roll 43 is provided in a manner opposing a peripheral surface of the downstream roll 41, and the first sheet 1S and the second sheet 2S are pressed against the peripheral surface of the downstream roll 41 with the second roll 43. In this manner, a joining strength between these sheets 1S and 2S can be increased. It is to be noted that each of these first and second rolls 33 and 43 may be either a driven roll or a driving roll as long as it rotates at a peripheral speed V31, V41 that is substantially the same as that of the corresponding upstream or downstream roll 31, 41.

From the point of view of ensuring the above-mentioned point of action Pa of the tensile load F, a plurality of suction holes may be provided on the peripheral surfaces of the upstream roll 31 and the downstream roll 41 instead of, or in addition to, the first roll 33 and the second roll 43 to hold the first sheet 1S by suction against the peripheral surface and further provide an anti-slippage measures on the peripheral surface such as by incising a number of recesses and projections.

Further, preferably, with regards to a winding angle of the first sheet 1S to the downstream roll 41, as shown, in FIG. 4, it is preferable that a phase angle between a winding start position Pw of the first sheet 1S on the downstream roll 41 to a joining position Ps is greater than or equal to 90°. With the phase angle being greater than or equal to 90°, since a contacting region between the peripheral surface of the downstream roll 41 and the first sheet 1S becomes larger and a contraction deformation in the width direction of the first sheet 1S by a friction force due to contact will be restricted, necking is less likely to occur.

It is preferable that the peripheral speed V41 of the downstream roll 41 is set at a value exceeding a multiple of 1.05, and more preferably to a value greater than or equal to 1.6 of the peripheral speed of the upstream roll 31. The reason is that, in order to produce a tension required for transporting the first sheet 1S, a difference in peripheral speeds of the upstream roll 31 and the downstream roll 41 needs to be about 0 to 5%.

Method of Producing Absorbent Article 5 of the Present Embodiment

Figure 7:
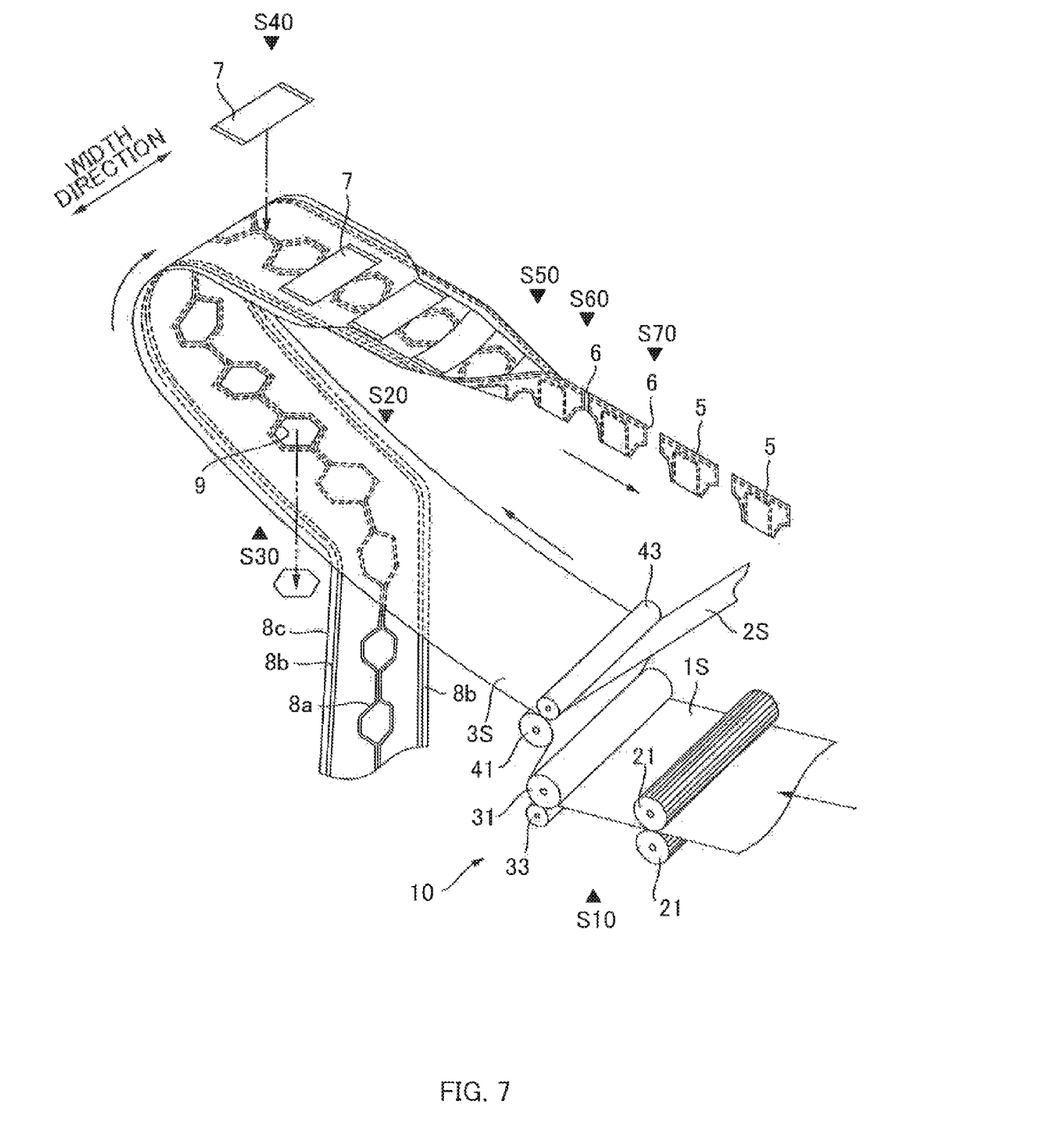
FIG. 7 is a schematic view of a method of producing a disposable diaper 5.

FIG. 7 is a schematic perspective of a method of producing a disposable diaper, which is taken as an example of the absorbent article 5. In this example, the above-mentioned composite sheet 3S is used as an exterior material of the diaper 5. The exterior material covers the absorbent body 7, which absorbs liquid, front outside and forms the exterior material of the diaper 5. According to this producing method, various processes are applied on the composite sheet 3S while the composite sheet 33 is being transported along the longitudinal direction in a state where the composite sheet 3S continues in its longitudinal direction, and the diaper 5 is manufactured. It is to be noted that, in the following description, a direction orthogonal to the above-mentioned longitudinal direction is referred to as a width direction, but this width direction is to mean a width direction of the composite sheet 3S and is different from a width direction of the diaper 5.

As shown in FIG. 7, the method of producing the diaper 5 includes a first step S10 in which the composite sheet 3S continuing in the longitudinal direction is produced, a second step S20 in which a leg elastic member 8a and a waist elastic member 8b are joined to the composite sheet 3S, a third step S30 in which leg opening 9 is formed as an opening in the composite sheet 3S, a fourth step S40 in which the absorbent body 7 is joined to a skin-side contact surface of the composite sheet 3S intermittently along the longitudinal direction, a fifth step S50 in which the composite sheet 3S is folded in half in the width direction and overlapped, a sixth step S60 in which the above-mentioned composite sheet 3S folded in half is joined by forming a joining section 6 at a product pitch of the diaper 5 in the longitudinal direction, and a seventh step S70 in which the composite sheet 3S is cut at the joining section 6 and divided into unit product of the diaper 5.

The first step S10 is the same as the above-mentioned method of producing the composite sheet 3S. That is to say, the above-mentioned producing apparatus 10 is arranged at a position of the first step S10, and thus, the composite sheet 3S having a stretchability is produced.

The leg elastic member 8a and the waist elastic member 8b related to the second step S20 is, for example, a continuously supplied rubber thread. These elastic members 8a, 8b are, in a step preceding the second step S20, firstly secured to an appropriate continuous sheet 8c while being reciprocated in the width direction with an appropriate guiding member (not shown). Thereafter, the sheet 8c is overlapped with the composite sheet 3S at the second step S20 and thereby these elastic members 8a, 8b are interposed and joined between the continuous sheet 8c and the composite sheet 3S.

It is not limited thereto and, for example, the sheet may be attached to the composite sheet 3S in the second step S20 after the elastic members 8a and 8b have been disposed between a pair of sheets and joined together, or, separately, the sheet may be attached to the composite sheet 3S in such a manner that the composite sheet 3S is sandwiched between the elastic members 8a and 8b after having joined only the elastic members 8a and 8b to the composite sheet 3S at the second step S20.

The leg opening 9 related to the third process S30 is formed by stamping by, for example, a die cutter (not shown).

The absorbent body 7 related to the forth step S40 has, for example, a main body of pulp fiber formed into a predetermined shape which is covered with a liquid permeable sheet from the skin-side contact surface and covered with a liquid non-permeable sheet from a non-skin-side contact surface. Then, when joining to the composite sheet 3S, the longitudinal direction of the absorbent body 7 is oriented in the width direction of the composite sheet 3S and is placed on the composite sheet 3S. It is to be noted that, a three dimensional gathering may be provided on the liquid permeable sheet of the skin-side contact surface, the liquid permeable such as tissue paper may be inserted between the main body and the liquid permeable sheet or the liquid non-permeable sheet.

In the fifth step S50, the composite sheet 3S is gradually folded in half in such a manner that the skin-side contact surface is placed inwardly by an appropriate guiding member (not shown) during a process of being transported in the longitudinal direction and thus a stomach-side section and a back-side section of the diaper 5 is overlapped.

The joining section 6 related to the sixth step S60 is, for example, formed by welding by heat sealing, sonic sealing, and the like. It is to be noted that this joining section 6 is situated at a flank portion of the diaper 5.

In the seventh step S70, the composite sheet 3S folded in half is divided at the joining section 6 with a cutter roll (not shown) and thus the draper 5 as a product unit is produced.

It is to be noted that, in the above-mentioned, example, the absorbent body 7 is joined to the composite sheet 3S in the forth step S40, but the joining timing is not limited thereto. For example, the absorbent body 7 may be joined to the second sheet 2S in advance in a step preceding the first step S10. In such a case, it is preferable that a recessed section is formed on the peripheral surface of the downstream roll 41 in order to perform a process of forming a recessed section that accommodates the absorbent body 7 in the first sheet 1S.

Other Embodiments

The embodiments of the aspects of the invention have been described above, but the invention is not limited to such embodiments and variants described below are also possible.

In the above-mentioned embodiment, as shown in FIG. 4, the producing method in which the gear drawing step is performed before the extending and joining process has been illustrated, but the gear drawing step may be dispensed with. In other words, the first, sheet 1S that has not been drawn may be directly supplied to the upstream roll 31 related to the extending and joining step. And, in this case, the extending process of the first sheet by the upstream roll 31 and the downstream roll 41 becomes a process that is also a drawing process with which stretchability is developed in the first sheet 1S.

In the embodiments described above, a non-woven fabric of a commingled type containing two types of fiber, that are an extensible fiber and a stretchable fiber, has been illustrated, but it is not limited thereto and may be a woven fabric. The types of fabric may be three or more types and there may be two or more layers that are layered in a thickness direction in such a manner that a layer of only the extensible fiber and a layer of only the stretchable fiber are provided in separate layers. Further, the first sheet 1S may be of a material that is a film-like material in which a film of an extensible material and a film of a stretchable material are joined, and may be a sheet in which a film of either the extensible material or the stretchable material and a fabric layer of either the extensible material or the stretchable material are combined.

Further, as long as it is a sheet that develops stretchability as shown in FIG. 2B in the drawing process, it is not limited to those described above, and the first sheet 1S may be of a material that is a non-woven fabric or a woven fabric containing at least one of the extensible fiber and the stretchable fiber, and may be of a film including at least one of the extensible material and the stretchable material. It is to be noted that what is referred to as the first sheet 1S having a high stretchability is, for example, a sheet that extends without being broken due to plastic deformation when extended from its natural length to 1.6 times the natural length.

In the above-mentioned embodiment, the configuration in which the first sheet 1S is looped around the upstream roll 31 and the downstream roll 41 in an S-shaped manner has been illustrated, however, as long as it is a configuration in which the second sheet 2S is overlapped and joined to a portion of the first sheet 1S in contact with the downstream roll 41, it is not limited thereto and may be, for example, the configuration of the above-mentioned FIG. 5.

Figure 8:
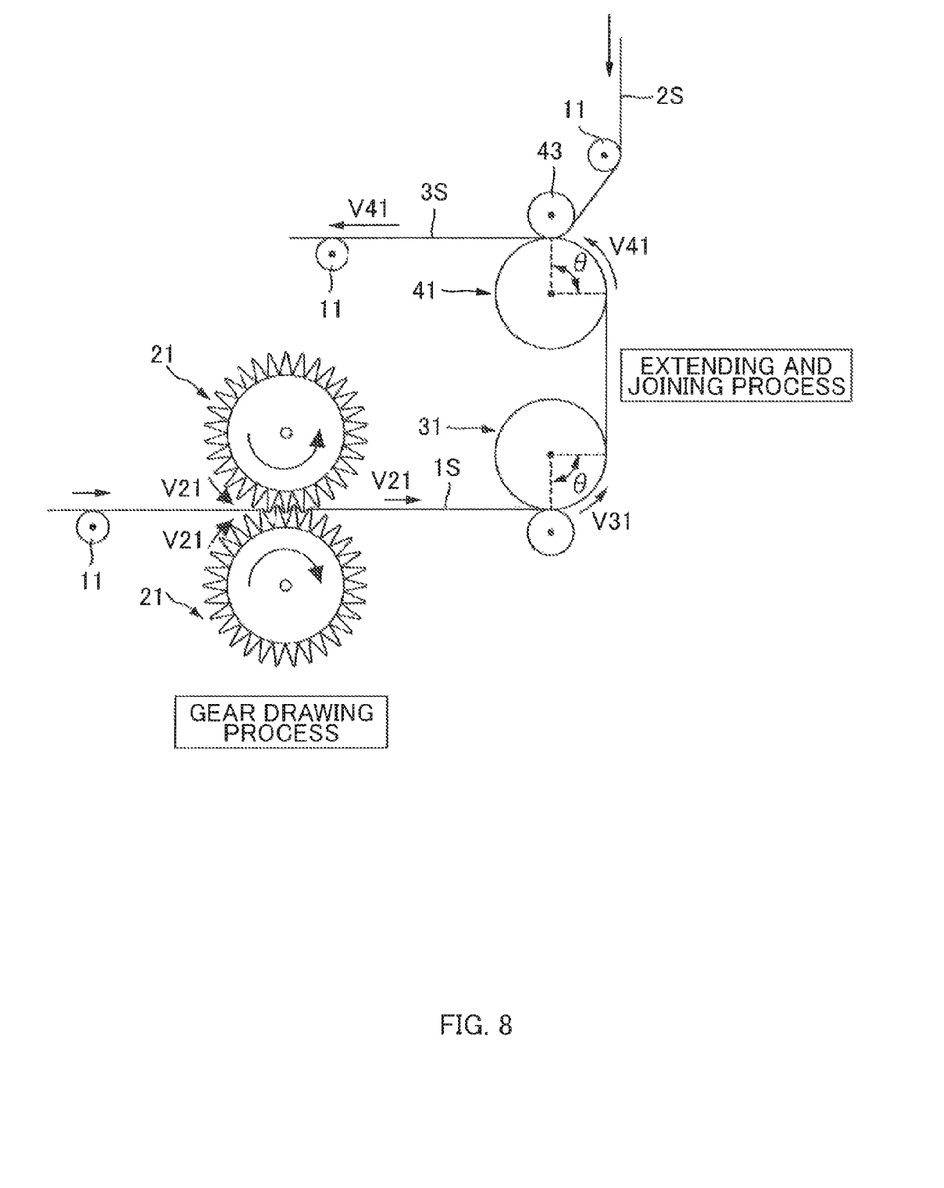
FIG. 8 is a schematic view of a variant of the configuration of FIG. 5.

Now, explaining the details of the configuration of FIG. 5, in the configuration of FIG. 5, the upstream roll 31 and the downstream roll 41 are brought into contact with surfaces (a back surface of the first sheet 1S in the example of FIG. 5) of the same side to each other regarding the front and back of the first sheet 1S and directions of rotation of the respective rolls 31 and 41 are also made in the same direction to each other. In such a configuration, further, an exemplary configuration of FIG. 8 can be illustrated as its variant. Now, in the configuration of the above-mentioned FIG. 5, the first sheet 1S is not wound on each of the rolls 31 and 41 but rather only brought into contact therewith, and in the configuration of FIG. 8, the first sheet 1S is wound at a predetermined winding angle θ onto each of the rolls 31 and 41, and thus the first sheet 1S is looped around on the upstream roll 31 and the downstream roll 41 in a U-shaped manner. Here, in the latter configuration of FIG. 8, a tension may be applied on the first sheet 1S by a friction force against the peripheral surfaces of the rolls 31 and 41 based on the winding angle θ. Therefore, there is an advantage that the first roll 33 that was necessary for the purpose of applying a tension on the first sheet, i.e., the first roll 33 that presses the first sheet against the peripheral surface of the upstream roll 31, can be dispensed with.

In the above-mentioned embodiment, the radii R31 and R41 of the upstream roll 31 and the downstream roll 41 have not been described, but may be either the same radius or different radius to each other.

In the above-mentioned embodiment, it has not been described whether or not heating or cooling of the upstream roll 31 and the downstream roll 41 is required, but the upstream roll 31 and the downstream roll 41 may be provided with a heater or a cooler installed therein.

REFERENCE SIGNS LIST 1S first sheet, 1Sa portion,
2S second sheet, 3S composite sheet,
5 diaper (absorbent article), 6 joining section, 7 absorbent body,
8a leg elastic member, 8b waist elastic member,
8c continuous sheet, 9 leg opening,
11 transport roll, 10 composite sheet-producing apparatus,
21 gear roll, 21a peripheral surface, 21t tooth,
31 upstream roll, 33 pressing roll (first roll),
41 downstream roll, 43 pressing roll (second roll),
E amount of drawing, F tension load, J amount of stretch,
Lf interval, P0 origin, P1 point of inflection,
Pa position of application, Ps joining position,
V21 peripheral speed, V31 peripheral speed, V41 peripheral speed,
S10 first step, S20 second step, S30 third step,
S40 forth step, S50 fifth step, S60 sixth step,
S70 seventh step

The invention claimed is:

1. A method of producing a composite sheet having stretchability, the producing including joining a first sheet in which stretchability in a longitudinal direction of the first sheet is developed by being subjected to a drawing process in the longitudinal direction and a second sheet having stretchability in a longitudinal direction of the second sheet that is lower than the stretchability of the first sheet, the longitudinal directions being aligned with each other, the method comprising:

extending the first sheet in the longitudinal direction of the first sheet, while transporting the first sheet in the longitudinal direction of the first sheet with the first sheet being in contact with an upstream roll and a downstream roll that rotate adjacent to each other, by providing a difference in peripheral speeds between the upstream roll and the downstream roll;

joining the second sheet to a portion of the first sheet in an overlapped manner by pressing the second sheet against the downstream roll, on an upstream side of the upstream roll, passing the first sheet that has not been subject to a drawing process through a gap between a pair of gear rolls, the gear rolls rotating with a plurality of teeth formed on each peripheral surface mating with each other, and drawing the first sheet in a peripheral direction of one of the gear rolls by the teeth to develop stretchability in the first sheet, wherein the first sheet in which the stretchability has been developed is supplied to the upstream roll, wherein an extending multiple Ms is less than or equal to a drawing multiple Mg, wherein the extending multiple Ms is a total length in the longitudinal direction after the extending divided by a total length in the longitudinal direction before the extending, wherein the drawing multiple Mg is a total length in the longitudinal direction after the drawing divided by a total length in the longitudinal direction before the drawing, and wherein the extending multiple Ms is greater than 1.

2. A method of producing a composite sheet according to claim 1, wherein the first sheet is looped around the upstream roll and the downstream roll in an S-shaped manner.

3. A method of producing a composite sheet according to claim 2, wherein the upstream roll and the downstream roll are arranged in such a manner that a length of a portion of the first sheet bridged between the upstream roll and the downstream roll is shorter than a sum of a radius of the upstream roll and a radius of the downstream roll.

4. A method of producing a composite sheet according to claim 1, wherein a peripheral speed of the downstream roll is set at a multiple of greater than or equal to 1.6 of a peripheral speed of the upstream roll.

5. A method of producing a composite sheet according to claim 1, wherein
- the first sheet is wound around the downstream roll at a predetermined winding angle; and
- a phase angle between a winding start position of the first sheet on the downstream roll and a joining position where the second sheet is joined to the first sheet is greater than or equal to 90°.

6. A method of producing a composite sheet according to claim 1, further comprising:
- arranging a first roll in a rotatable manner and opposing the upstream roll;
- pressing the first sheet against the upstream roll by the first roll, the first sheet being in contact with the upstream roll;
- arranging a second roll in a rotatable manner and opposing the downstream roll; and
- pressing the second sheet against the first sheet by the second roll, the first sheet being in contact with the downstream roll.

7. A method of producing a composite sheet according to claim 1, further comprising applying an adhesive agent to the first sheet and the second sheet,
wherein
- the joining of the first sheet and the second sheet is performed after the applying the adhesive agent, and
- the applying of the adhesive agent is intermittently performed in the longitudinal directions of the first sheet and the second sheet.

8. A method of producing a composite sheet according to claim 1, wherein the extending the first sheet with the upstream roll and the downstream roll is one of a drawing process that develops the stretchability in the first sheet and a drawing process that increases the stretchability in the first sheet.

9. A method of producing an absorbent article, comprising:
producing a composite sheet having stretchability, the producing including joining a first sheet in which stretchability in a longitudinal direction of the first sheet is developed by being subjected to a drawing process in the longitudinal direction and a second sheet having stretchability in a longitudinal direction of the second sheet that is lower than the stretchability of the first sheet, the longitudinal directions being aligned with each other;
wherein the producing further comprises:
- extending the first sheet in the longitudinal direction of the first sheet, while transporting the first sheet in the longitudinal direction of the first sheet with the first sheet being in contact with an upstream roll and a downstream roll that rotate adjacent to each other, by providing a difference in peripheral speeds between the upstream roll and the downstream roll, and
- joining the second sheet to a portion of the first sheet in an overlapped manner by pressing the second sheet against the downstream roll;
- on an upstream side of the upstream roll, passing the first sheet that has not been subject to a drawing process through a gap between a pair of gear rolls, the gear rolls rotating with a plurality of teeth formed on each peripheral surface mating with each other,
- drawing the first sheet in a peripheral direction of one of the gear rolls by the teeth to develop stretchability in the first sheet, and
- joining an absorbent body to a skin-contacting side of the composite sheet,
wherein the first sheet in which the stretchability has been developed is supplied to the upstream roll,
wherein an extending multiple Ms is less than or equal to a drawing multiple Mg,
wherein the extending multiple Ms is a total length in the longitudinal direction after the extending divided by a total length in the longitudinal direction before the extending,
wherein the drawing multiple Mg is a total length in the longitudinal direction after the drawing divided by a total length in the longitudinal direction before the drawing, and
wherein the extending multiple Ms is greater than 1.

10. A method of producing an absorbent article according to claim 9, further comprising:
arranging a pressing roll in a rotatable manner and opposing the downstream roll,
wherein, in the joining, the second sheet is joined to the portion of the first sheet by being sandwiched with the first sheet between the pressing roll and the downstream roll.

11. A method of producing an absorbent article according to claim 9, wherein, in the action of joining, the second sheet is joined to the portion of the first sheet on the downstream roll.

12. A method of producing a composite sheet according to claim 1, further comprising:
arranging a pressing roll in a rotatable manner such that the pressing roll opposes the downstream roll,
wherein, in the action of joining, the second sheet is joined to the portion of the first sheet by being sandwiched with the first sheet between the pressing roll and the downstream roll.

13. A method of producing a composite sheet according to claim 1, wherein, in the joining, the second sheet is joined to the portion of the first sheet on the downstream roll.

14. A method of producing a composite sheet according to claim 1, further comprising:
prior to the action of joining the second sheet to the first sheet, developing stretchability in the longitudinal direction of the first sheet by subjecting the first sheet to the drawing process in the longitudinal direction, wherein
when the second sheet is joined to the first sheet, the second sheet has stretchability in the longitudinal direction of the second sheet that is lower than the stretchability of the first sheet.

15. A method of producing a composite sheet according to claim 1, wherein the total length in the longitudinal direction after the extending is greater than the total length in the longitudinal direction before the extending.

16. A method of producing an absorbent article according to claim 9, wherein the total length in the longitudinal direction after the extending is greater than the total length in the longitudinal direction before the extending.

* * * * *